US009237036B2

United States Patent
Du (10) Patent No.: US 9,237,036 B2
(45) Date of Patent: *Jan. 12, 2016

(54) USER INITIATED AND CONTROLLED DELIVERY IN HYBRID MODE OF ELECTROMAGNETICALLY TRANSMISSIBLE CONTENTS TO RECIPIENTS IN DESIGNATED DELIVERY LOCATIONS OR APPARATUS

(76) Inventor: Lee Du, Palo Alto, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 12/928,984

(22) Filed: Dec. 24, 2010

(65) Prior Publication Data

US 2011/0099238 A1    Apr. 28, 2011

Related U.S. Application Data

(63) Continuation-in-part of application No. 12/077,105, filed on Mar. 17, 2008.

(60) Provisional application No. 61/284,897, filed on Dec. 28, 2009, provisional application No. 60/997,252, filed on Oct. 1, 2007.

(51) Int. Cl.
| | |
|---|---|
| G06F 15/16 | (2006.01) |
| H04L 12/58 | (2006.01) |
| G06Q 10/10 | (2012.01) |
| H04L 29/08 | (2006.01) |
| G10L 15/26 | (2006.01) |

(52) U.S. Cl.
CPC .......... *H04L 12/5885* (2013.01); *G06Q 10/107* (2013.01); *H04L 12/583* (2013.01); *H04L 12/5815* (2013.01); *H04L 51/043* (2013.01); *H04L 51/063* (2013.01); *H04L 51/34* (2013.01); *H04L 67/06* (2013.01); *G10L 15/26* (2013.01)

(58) Field of Classification Search
USPC .......... 709/201, 202, 203, 218, 232, 238, 249, 709/246
See application file for complete search history.

(56) References Cited

U.S. PATENT DOCUMENTS

| | | | |
|---|---|---|---|
| 2,672,503 A | | 3/1954 | Hallden et al. |
| 4,713,780 A | * | 12/1987 | Schultz et al. ................ 709/206 |
| 4,816,911 A | * | 3/1989 | Kirsch et al. ............ 379/100.15 |
| 5,557,320 A | * | 9/1996 | Krebs ............................ 725/114 |
| 5,557,541 A | * | 9/1996 | Schulhof et al. ................ 700/94 |
| 6,615,234 B1 | * | 9/2003 | Adamske et al. ............. 709/203 |
| 6,947,738 B2 | * | 9/2005 | Skog et al. .................. 455/426.1 |
| 7,263,493 B1 | * | 8/2007 | Provost et al. .................... 705/4 |
| 7,263,528 B2 | * | 8/2007 | Haff et al. ..................... 707/622 |
| 7,414,747 B2 | * | 8/2008 | Ohta ........................... 358/1.15 |
| 7,676,680 B2 | * | 3/2010 | Seelos et al. .................. 713/179 |
| 7,804,941 B2 | * | 9/2010 | Keiser et al. ................ 379/88.14 |
| 8,170,591 B2 | * | 5/2012 | Gosset et al. ................. 455/466 |
| 8,208,160 B2 | * | 6/2012 | French et al. ................ 358/1.15 |
| 8,494,907 B2 | * | 7/2013 | Lerman et al. ............. 705/14.73 |
| 2002/0174073 A1 | | 11/2002 | Nordman et al. |
| 2003/0012379 A1 | * | 1/2003 | Foth ............................... 380/243 |

(Continued)

*Primary Examiner* — Michael Y Won
(74) *Attorney, Agent, or Firm* — Bo-In Lin (57) ABSTRACT

The present invention discloses a network communication system that includes a network processing center for receiving and converting an electronic or electro-magnetically transmissible data/content into a physically deliverable object and/or network transmissible content data files for carrying out a hybrid delivery of the data/content by a physical delivery process and/or a network electro-magnetic delivery process to a recipient or an ECRMA.

44 Claims, 3 Drawing Sheets

(56) References Cited

U.S. PATENT DOCUMENTS

| | | | |
|---|---|---|---|
| 2003/0028890 A1* | 2/2003 | Swart et al. | 725/91 |
| 2003/0068045 A1* | 4/2003 | Foth | 380/270 |
| 2003/0074477 A1* | 4/2003 | Fukushima et al. | 709/246 |
| 2004/0221048 A1* | 11/2004 | Ogier | 709/229 |
| 2005/0065903 A1* | 3/2005 | Zhang et al. | 707/1 |
| 2005/0086501 A1* | 4/2005 | Woo et al. | 713/189 |
| 2006/0046758 A1 | 3/2006 | Emami-Nouri et al. | |
| 2006/0101115 A1* | 5/2006 | Gleckman | 709/203 |
| 2007/0038702 A1 | 2/2007 | Taylor et al. | |
| 2007/0061471 A1 | 3/2007 | Glover et al. | |
| 2008/0005250 A1* | 1/2008 | Oksum | 709/206 |
| 2008/0034048 A1 | 2/2008 | Shabtu et al. | |
| 2008/0288594 A1 | 11/2008 | Muus | |
| 2009/0015672 A1 | 1/2009 | Clapp | |
| 2009/0089385 A1* | 4/2009 | Du | 709/206 |
| 2009/0241015 A1* | 9/2009 | Bender et al. | 715/202 |
| 2011/0103374 A1* | 5/2011 | Lajoie et al. | 370/352 |
| 2012/0136713 A1* | 5/2012 | Du | 705/14.41 |
| 2012/0140265 A1* | 6/2012 | Laursen et al. | 358/1.15 |

* cited by examiner

USER INITIATED AND CONTROLLED DELIVERY IN HYBRID MODE OF ELECTROMAGNETICALLY TRANSMISSIBLE CONTENTS TO RECIPIENTS IN DESIGNATED DELIVERY LOCATIONS OR APPARATUS

This application is a Non-provisional Application and claims a Priority Date of Dec. 28, 2009 based on a Provisional Application 61/284,897 filed by the Applicant of this invention. This Application is further a Continuation-in-Part Application (CIP) of a co-pending Non-provisional application Ser. No. 12/077,105 that was filed on Mar. 17, 2008 by the Applicant of this Application. Application Ser. No. 12/077,105 claims a priority of Oct. 1, 2007 of a provisional Patent Application 60/997,252. The disclosures made in 61/284,897, Ser. No. 12/077,105 and 60/997,252 are hereby incorporated by reference in the present patent application.

BACKGROUND OF THE INVENTION

1. Field of the Invention

This invention relates generally to the systems and methods for applying the network communications to enhance delivery of the electro-magnetically transmissible contents from a sender to the designated recipients. More particularly, this invention is related to methods and network systems that allows a sender to control and direct, and allows a sender to specify among the many options, the delivery of either an article that embodies the Internet-deliverable contents or different functional devices that embodies the contents to designated recipients to achieve delivery speed while reducing the delivery costs.

2. Description of the Related Art

Even through more communications are now carried over the Internet with speed and greatly improved efficiency, however, there are still limitations that the Internet communications cannot satisfy. A most obvious limitation is a communication to a person who has limited or even no access to Internet. This group of people may include some elderly folks or economically disadvantageous people who do not use a computer or devices to have the Internet access at all. As senders of information often initiate a message that is suitable for Internet transmission, e.g., e-mail, the senders are required to apply a different mode of communication, e.g., sending the message as printed copy separately through regular mail services, in order to send the same message to a person who does not communicate over the Internet.

Furthermore, in the field of commercial advertisement, there are still a large amount of printed materials delivered through the regular mail services for promoting commercial products or services. However, such distribution of the printed materials for product or service promotion are limited to certain geographic locations, generally within the territory of a nation through the domestic mail services due to cost considerations. International delivery of printed materials would be too costly for mass mail promotions. Notwithstanding the availability of high-speed data transmission across the globe without national boundaries, an effective solution to overcome the geographic limitations of mail deliveries is still not yet available.

Further limitation of current electronic commerce over the Internet is the lack of control and flexibility of choices for a message or content sender. For example, it is true that a sender of gift or message is provided with options to order gift items from online shops for delivering to a recipient; however, the online shops under most circumstances dictate what and how the messages, and that the messages related with this order, are delivered to the message or gift recipient. A sender does not have much freedom to customize the fashion and ways the messages are delivered.

Another difficulty of the network communications over the Internet is related to the requirements that either a document must be personally delivered or that a returning document must be personally signed, sometimes before a notary public, in order to have certain legal validity. Particularly, when such document must be delivered to an area that require extended delivery processes and time, and the signatures of the senders and/or the recipients be required, the speed of the Internet transmission has not yet been utilized to provide a solution to overcome such difficulties. Current document systems are further limited by speed when technical or trade journals, magazines, or newspapers are delivered over the national boundaries of remote areas.

In order to overcome the above-discussed limitations and difficulties, a prior patent application Ser. No. 12/077,105 was submitted by the Applicant of the present invention to disclose systems and methods to deliver tangible deliverable objects that contain electronic contents including multimedia contents that may be transmitted over the telecommunication networks (TN) with its various sub-networks interconnected by the connections include but not limited to Internet, the wired and wireless telephone networks, cable systems, etc. The sub-networks of TN includes but not limited to Intranet, Wide Area Network (WAN), Metropolitan Area Network (MAN), Campus Area Network (CAN), Local Area Network (LAN), Wireless local area network (WLAN), Personal Area Network (PAN), Virtual Private Network (VPN), Client/Server Network, Peer-to-Peer Network, etc.

However, the delivery of a tangible deliverable object has several limitations. First limitation is a requirement of the involvement of a delivery agent and/or vehicle to accomplish the delivery of the tangible deliverable. It may be difficult where conditions limit the travel of the delivery agent and/or vehicle to reach the delivery destination. A second limitation is the time required for the process to deliver the tangible deliverable. Delivery may take relatively extended time in delivering to destinations due to travel difficulties, and/or other situations, even that the delivery process is much faster than the traditional mail system, especially under the circumstances when the delivery must cross over the state and national boundaries. Furthermore, a sender has only limited choices to select the final delivery form, i.e., in the form of a tangible deliverable.

Therefore, a need exists in the art of telecommunication network to provide improved system configuration to implement a delivery method for delivering contents transmitted over the telecommunication networks in more varieties of embodiments of the electronic contents through more varieties of delivery devices and routes such that the above-discussed difficulties and limitations may be resolved.

SUMMARY OF THE PRESENT INVENTION

It is therefore an aspect of the present invention to provide new and improved systems and methods to facilitate more rapid and efficient delivery of electronic contents that are transmissible through the telecommunication network. The delivery can be accomplished by use of a tangible deliverable object that embodies the contents transmitted in the electromagnetic form via the telecommunication networks or through electronic content receiving and managing apparatus (ECRMA) or varieties of routes and forms such that the efficiency of delivery can be improved and the time of delivery can be further shortened.

Specifically, it is an aspect of the present invention to provide systems and methods with server stations function as service processing center and also remote distribution stations that may be implemented with an electronic content receiving and managing apparatus (ECRMA) such apparatus may include passive receiving devices and e-mail devices. The server stations are connected to the Internet or any other types of network systems for transmitting network transmissible contents. The server stations receive the network transmissible contents. The sever station can either convert the network transmissible contents into physically deliverable items to execute a delivery program as instructed and designated by a content and message sender to the designated recipient. Alternately, the server station may transmit the network transmissible contents to the ECRMA that may include content-receiving equipment such as passive receiver devices accessible by user(s) and/or e-mail devices ready for carrying out further operations on the electronic contents. An example of this application is that the aforementioned information is downloaded to a mobile phone, or a digital media player such as iPod, and iPad [iPod and iPad are TM of Apple, Inc.]), and the mobile phone or media player is delivered to the designated recipient. Then, if desired, the information in the delivered device, in its original form or after undergoing further processing, can be resent to another recipient through the telecommunication networks.

Another aspect of this invention is to provide convenience and efficiency by setting up processing center with server stations connected through telecommunication network to a message sender. Each of the network-accessible sender equipment serves an equivalent function as a modern sender-controllable telegram machine. A message sender transmits network transmittable contents to the server stations. The server stations then receives the contents transmitted over the network and carry out an optional operation to either convert the content into tangible deliverable items such as a letter, a printed document, a compact disk, or any other physical embodiment of the content according to the content sender's instruction. Alternately, the server stations may execute a process to transmit the contents to an ECRMA that receives and manages the electromagnetic information through a telecommunication network (TN) in a non-tangible format. The delivery process will not be affected by traffic conditions in the real world. The delivery time is much faster than the delivery of a tangible deliverable. The process is more resource-efficient as it involves less manpower and other resources. The electronic content receiving and managing apparatus (ECRMA) can be a more functioning-capable device, network, computer system. This feature is especially useful in the field of digital document management. One specific example is to provide the delivered contents and store the contents in various 'fee-per-service' facilities.

Another aspect of this invention is to provide a hybrid network-transmissible content delivery system wherein the contents may be delivered by the delivery of a tangible deliverable. Furthermore, the electronically transmissible contents (e-TC) received from various senders can be delivered in one single tangible deliverable, achieving the efficiency of delivery materials. And the information from various senders can be distinguished and separately processed by either embedded mechanism including but not limited to software function in the tangible deliverable, and/or by dedicated software which the recipient can use. This system of this invention will enable any electronically transmissible contents (e-TC) is TN-transferable by individual user(s) or by the service station (s) of the system, to be delivered in multiple routes, devices, and functional processes. People with or without access to TN can send the information to be delivered via TN in multiple manners. The system of this invention therefore provides more choices to deliver the electromagnetic information.

Furthermore, in this hybrid delivery system, the tangible deliverable can be a device. This device is a tangible deliverable, but not a simply a storage medium of magnetic/optical medium. It can have the function of displaying and processing the contained electromagnetic information of text, audio, graphic/video data and any other electromagnetic information. It also has the capability to resend the aforementioned information by connecting itself through the TN.

Another aspect of this invention is to provide a great deal of flexibilities for the sender to specify and customize the packaging and forms of the deliverable items and furthermore, the delivery destination may include an e-mail device which can be an element of the ECRMA. The e-mail devices differ from other e-mail services currently in use in the following ways. The 'list of contents' in the 'mail' can be viewed before decision was made to selectively open or download part or whole of the 'mail'. The contents can be further sent to different ECRMA even before the 'mail' is opened. In this case further functional processes may be carried out without the need to upload the contents. Of course, additional contents can be added (uploaded) to the previous contents and sent as a new 'package'. This e-mail device can receive 'mail' from users who have no access to TN. One request from the sender allows the TN-transferable electromagnetic information to be sent in different and multiple ways, it can be a tangible, and/or intangible format(s) including the ECRMA. Furthermore, the ECRMA can function in many ways to accomplish the information processing including but not limited to the conversion features of converting video or audio contents to textual output or converting a textual data into audio output thus the ECRMA can further enhance the convenience and process of the contents received by the recipients.

Another aspect of this invention is the convenience of providing a delivery status-tracking feature to continuously monitoring and confirming the delivery status through the server station serving the function of service processing center distributed over different locations. Such monitoring and confirmation features are particularly useful for timely and securely delivering legal or time-sensitive materials.

Briefly, in a preferred embodiment, the present invention discloses a network communication system. The network communication system further includes network processing stations/centers for receiving and converting electronic or electro-magnetic data/content transmissible through telecommunication network into a hybrid content deliverable object comprises network transmissible content data files and/or physically deliverable object for carrying out a hybrid delivery of the data/content by a physical delivery process and/or a network electro-magnetic delivery process to a recipient or an ECRMA. In an embodiment of the present invention, the network processing station further receiving and converting data/content transmitted with an electronic mail (e-mail) into a printed copy and/or the network transmissible content data files for physically delivering and/or transmitting through a network electro-magnetic delivery process to a recipient or an ECRMA. In another embodiment of the present invention, the network processing station further receiving and converting data/content transmitted with an electronic mail (e-mail) into a compact disk (CD)/DVD, or other magnetic/optical media and/or the network transmissible content data files as designated by the sender for physically delivering and/or transmitting through a network electro-magnetic delivery process to a recipient or an ECRMA. In an embodiment of the present invention, the network processing station further receiving and converting data/content transmitted with an electronic mail (e-mail) into a photographic picture and/or the network transmissible content data files for physically delivering and/or transmitting through a network electro-magnetic delivery process to a recipient or an ECRMA. In an embodiment of the present invention, the network processing station further receiving and converting data/content downloaded from a website or any other kinds of data-storage or downloadable resources into a printed copy and/or the network transmissible content data files for physically delivering and/or transmitting through a network electro-magnetic delivery process to a recipient or an ECRMA. In an embodiment of the present invention, the network processing station further receiving and converting data/content downloaded from a website or any other kinds of data-storage or downloadable resources into a compact disk (CD), or other magnetic/optical media and/or the network transmissible content data files as designated by the sender for physically delivering and/or transmitting through a network electro-magnetic delivery process to a recipient or an ECRMA. In an embodiment of the present invention, the network processing station further receiving and converting data/content downloaded from a website or any other kinds of data-storage or downloadable resources into a photographic picture and/or the network transmissible content data files for physically delivering and/or transmitting through a network electro-magnetic delivery process to a recipient or an ECRMA.

In summary, this invention discloses a hybrid method for delivering a physically deliverable object and/or network transmissible content data files to a remote recipient or an ECRMA, The hybrid method includes a step of transmitting an electronic or electro-magnetically transmittable content through a telecommunication network to a networked processing center/station for converting the electronic or electro-magnetically transmittable content into the physically deliverable object for delivering to and/or transmitting through a network electro-magnetic delivery process to the designated recipient or an ECRMA(s). In another embodiment, the step of transmitting and converting the electronic or electro-magnetically transmittable content further comprising a step of transmitting data/content with an electronic mail (e-mail) and converting the data/content into a compact disk (CD) or other magnetic/optical media and/or the network transmissible content data files as designated by the sender for delivering to the remote recipient or an ECRMA. In another embodiment, the step of transmitting and converting the electronic or electro-magnetically transmittable content further comprising a step of transmitting data/content with an electronic mail (e-mail) and converting the data/content into a photographic picture and/or the network transmissible content data files for delivering to the remote recipient or an ECRMA. In another embodiment, the step of transmitting and converting the electronic or electro-magnetically transmittable content further comprising a step of downloading data/content from a website or any other kinds of data-storage or downloadable resources and converting the data/content into a printed copy and/or the network transmissible content data files for delivering to the remote recipient or an ECRMA. In another embodiment, the step of transmitting and converting the electronic or electro-magnetically transmittable content further comprising a step of downloading data/content from a website or any other kinds of data-storage or downloadable resources and converting the data/content into a compact disk (CD) or other magnetic/optical media and/or the network transmissible content data files as designated by the sender for delivering to the remote recipient or an ECRMA. In another embodiment, the step of transmitting and converting the electronic or electro-magnetically transmittable content further comprising a step of downloading data/content from a website or any other kinds of data-storage or downloadable resources and converting the data file into a photographic picture and/or the network transmissible content data files for delivering to the remote recipient or an ECRMA.

These and other objects and advantages of the present invention will no doubt become obvious to those of ordinary skill in the art after having read the following detailed description of the preferred embodiment, which is illustrated in the various drawing figures.

DETAILED DESCRIPTION OF THE PREFERRED EMBODIMENT

Reference is now made to the above listed figures for describing, in detail, the preferred embodiments of the present invention. The figures referred to and the accompanying descriptions are provided only as examples of the invention and are not intended in any way to limit the scope of the claims appended to the detailed description of the embodiment.

Figure 1:
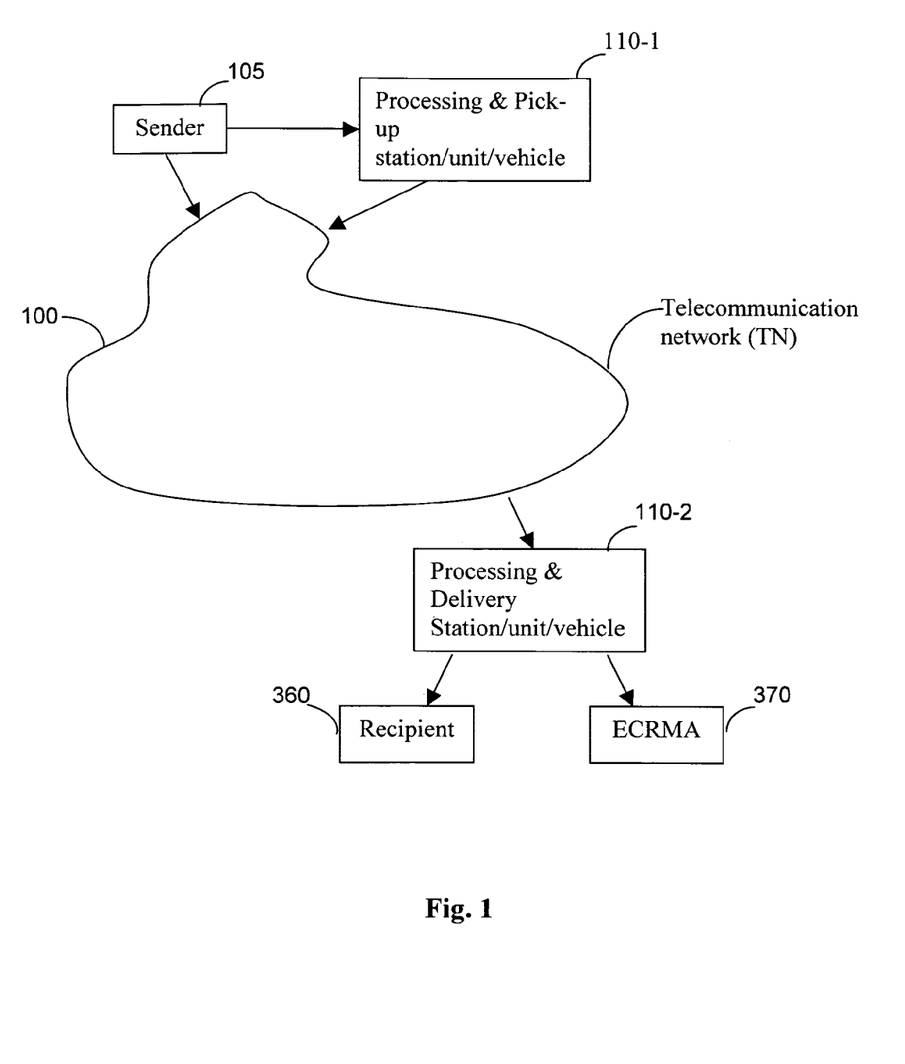
FIG. 1 is a network system includes an online server for receiving a sender-initiated message and orders to complete a delivery of hybrid delivery that may include a tangible deliverable object and/or electronic contents to an ECRMA (electronic content receiving and managing apparatus) or stations.

FIG. 1 is a functional block diagram of a hybrid electronic content delivery system of this invention. An electronic content sender 105 has an option to either upload the electronic content as an electronically transferable file through a telecommunication network (TN) 100 such as an Internet telecommunication network (TN) 100 to transmit the electronic content to a first processing/pickup/deliver station or vehicle 110-1. The electronic content sender 105 has an option to deliver a physical embodiment of the multimedia contents such as a USB drive, a DVD/CD, a flash memory stick, or a hardcopy or any other kind of content embodiment item or device to the processing/pickup/delivery station or vehicle 110-1. The processing/pickup and delivery station or vehicle then converts the electronic content delivered as the electronic embodiment device received from the electronic content sender 105 into a network transferable electronic content file that is ready for transfer over the telecommunication network (TN) 100 to a designated delivery destination. The designated delivery destination may include another processing or pickup and delivery station 110-2 on the recipient side to convert the electronic content into a deliverable electronic content embodiment device such as an USB drive, a DVD/CD or a printed document ready to deliver to an electronic content recipient 360 through a mail delivery or direct delivery by the processing or pickup station/vehicle 110-2. Alternately electronic content may also be delivered to different designate delivery destinations that may be an electronic content receiving and managing apparatus (ECRMA) 370 that may function as a passive receiver device or as a receiving and managing apparatus.

The electronic content receiving and managing apparatus (ECRMA) is a concept that covers a wide range of apparatus/devices. The simplest one may have the passive receiving function only while the more advanced one may carry on all function of receiving and managing electronic transmissible content (e-TC). The example of a simple ECRMA may be a device that can be connected to a wired or wireless phone line and receive e-TC. The example of a more advanced ECEMA may be a computer or a connected network of computers/apparatus and they can receive, store and manage/process the e-TC received and may retransmit the e-TC through the telecommunication networks (TN) to another recipient and/or apparatus in its original received form or in a processed/modified form. More examples of ECRMA may include smart phones, TVs, tablets, projectors, etc. The common feature of all ECRMA is that they all can receive e-TC through the TN via a data transfer protocol.

Unlike the prior patent application Ser. No. 12/077,105 this invention now provides broader scopes and more varieties of deliverable methods and devices to deliver the electronic contents transmissible through the telecommunication networks. The present invention further delivers the electronic contents to different functional devices that can embody and also process the contents for different purposes such as generate video and audio outputs and may further perform different functions by using the electronic contents. This invention thus provides more convenient and useful ways a recipient of the electronic contents can enjoy and make use of the contents received. A data conversion option as now provided in this invention further provides flexibility for converting the formats of the messages in textual, audio or video forms for more convenient and flexible transmissions.

Figure 2:
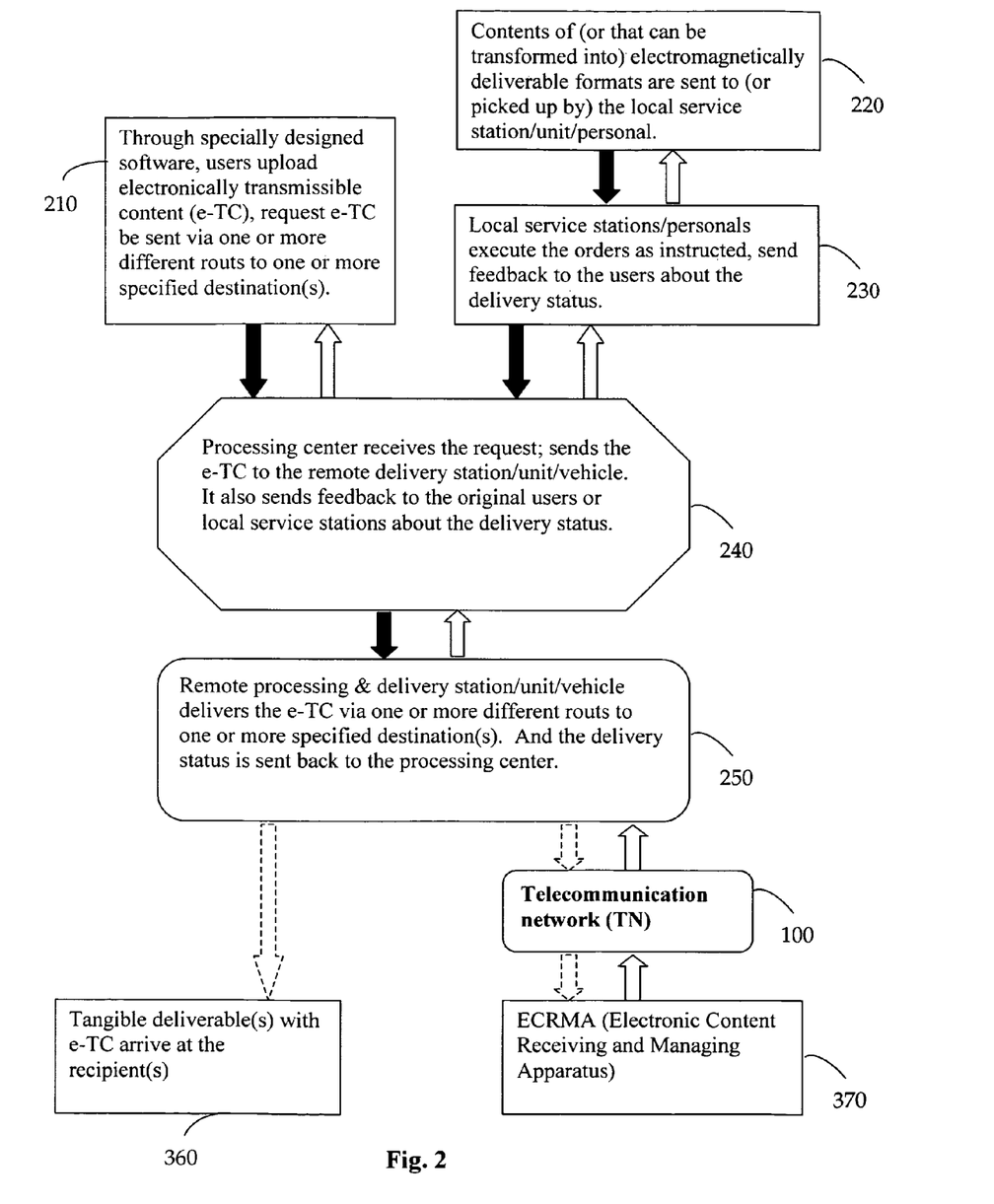
FIGS. 2 and 3 are flowcharts for showing the steps performed by the hybrid method of delivering a physically deliverable object embodies electro-magnetically transmittable contents and/or electronic contents to ECRMA or stations over the telecommunication network.

FIG. 2 is a flowchart for illustrating the processes according to an exemplary method of this invention. An electronic content sender 105 for sending the electronic content through hybrid multimedia content delivery system of this invention start the process by either upload electronically transmissible content through a telecommunication network to a processing center (step 210). The process may implement specially designed software to manage user upload contents as electronically transmissible contents (e-TC) and requests e-TC to be sent via one or more different routs to one or more specified destinations. In this case, the processing center may be an online delivery service station 110. Alternately, a user 105 may physically deliver a medium embodies the media contents such as a letter or pictures, or other contents ready for or can-be-converted to network or electro-magnetically transmissible contents to a local service station (Step 220), or drop the contents in pick-up locations/boxes arranged by the service station. The local service station then executes the orders received from the user and sends a status report to the user to update the user about the delivery status (Step 230). The e-TC includes the electro-magnetic transmissible contents either uploaded or physically received and/or converted by the processing center are sent to a remote delivery station through Internet or other methods of the telecommunication network (Step 240). In this step, the processing center further sends a status report about the reception and processing and delivery status of the contents received.

Then the remote delivery stations or a processing and delivery vehicle/unit has different options to process the e-TC received from the telecommunication network depending on different delivery routes and different final destinations of the electronic contents. The processing and delivery station or vehicle/unit first determines a delivery route and destination and sends a status back to the electronic content sender about the status of the process and delivery (step 250). The delivery and processing station or vehicle/unit may convert the electronic contents into a physically deliverable item such as a printed letter, an advertisement printout, a photo album, a musical or video CD/DVD or its equivalent, or any deliverable object that embodies the magnetic media, optical media, and other types of medium as may be developed in the future. The physically deliverable items that embody the e-TC are then delivered to the recipients followed by a delivery status report sent back to the user (Step 360). In this case, the designated recipient receives the network or electro-magnetically transmissible contents embodied in physical deliverable item. The delivery of the physically deliverable item can be flexibly arranged according to the instructions provided by the user when sending the contents through the network upload or physically delivered contents to a local service station (Step 220). Additionally, the processing and delivery station or vehicle may further transfer the electronic contents through a telecommunication network (TN) (step 100b) to an electronic content receiving and managing apparatus (ECRMA) (step 370) that may include a passive receiver device or an e-mail device or any other network message receiving apparatuses or devices.

Figure 3:
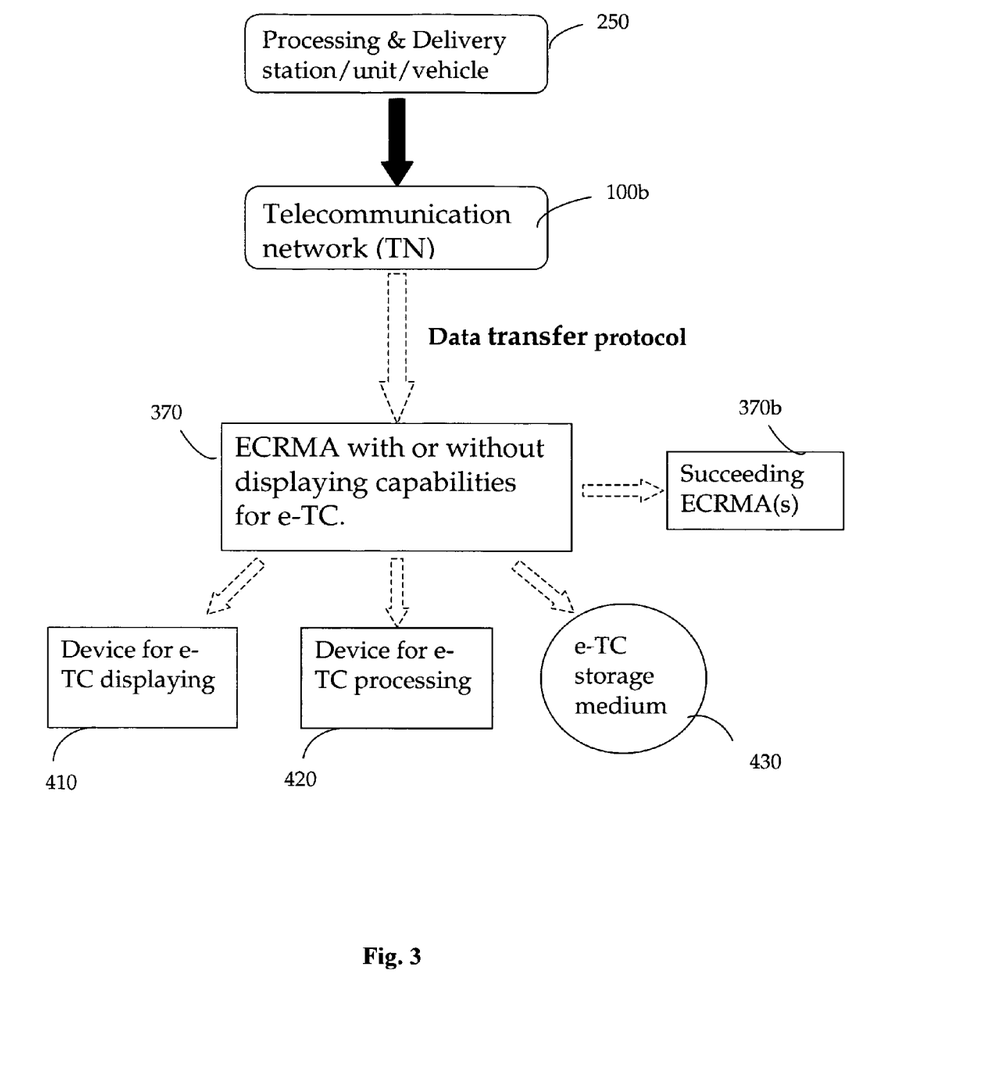

FIG. 3 shows the further details of the delivery of the e-TC from the processing and delivery station/unit/vehicle 250 through the telecommunication network (TN) 100b through a data transfer protocol to an ERCMA 370 with or without display capabilities to further process the e-TC. The data transfer protocol may include but not limited to push and/or pull and/or FTP (File Transfer Protocol) and/or other existing or future data transfer protocols which allow the transfer of e-TC through TN. The ERCMA may then utilize a device for e-TC display (step 410). Alternately, the ERCMA may send the e-TC to a device to further process the e-TC (step 420). Furthermore, the ERCMA may also send the e-TC to a storage medium ready for delivery or for other purposes. The ERCMA may include electronic mail devices or the passive receiver devices. The e-TC received by the ECRMA 370 from processing and delivery station/unit/vehicle 250 can be further sent to succeeding ECRMA(s) 370-b with a data transfer protocol. Then the ECRMA and succeeding ECRMA as receiver and sender devices may provide/send the electronic contents to other identities in different forms such as an electronic content (including but not limited to multimedia contents) displaying device (step 410), a device for message processing the e-TC (step 420) or a magnetic or optical media as a storage medium (step 430).

The present invention thus provides new and improved systems and methods to facilitate more rapid and efficient delivery of electronic contents transmissible through the telecommunication network. The delivery can be accomplished by use of a tangible deliverable object that embodies the contents transmitted in the electromagnetic form via the telecommunication networks. Or the delivery may be through ECRMA with varieties of routes and forms such that the efficiency of delivery can be improved and the time of delivery can be further shortened. Specifically, the delivery systems and methods may be implemented with server stations function as service processing center and also remote distribution stations. The server stations are connected to the Internet or any other types of network systems for transmitting network transmissible contents. The server stations receive the network transmissible contents. The sever station can either convert the network transmissible contents into physically deliverable items to execute a delivery program as instructed and designated by an electronic content sender to the designated recipient. Alternately, the server station may transmit the network transmissible contents to content distribution stations and then to ECRMA such as passive receiver devices accessible by designated recipient(s) and/or e-mail devices ready for carrying out further operations on the electronic contents. An example of this application is that the aforementioned information is downloaded to a mobile phone, or a digital media player such as iPod, [TM of Apple, Inc.]), or various e-readers such as Kindle (TM of Amazon), Nook (TM of Barnes & Noble), or e-Reader (TM of Sony), and the mobile phone or media player or e-reader is delivered to the designated recipient. Then, if desired, the information in the delivered device, in its original form or after undergoing further processing, can be resent to another recipient through the telecommunication networks.

The delivery systems and methods of this invention thus provide convenience and efficiency by setting up processing center with server stations connected through telecommunication network to a message sender. Each of the network-accessible sender equipment serves an equivalent function as a modern sender-controllable telegram machine. A message sender transmits network transmittable contents to the server stations. The server stations then send the contents transmitted over the network and carries out an optional operation to either convert the content into tangible deliverable items such as a letter, a printed document, a compact disk, or any other physical embodiment of the messages according to a message sender's instruction. Alternately, the server stations may execute a process to transmit the contents to an ECRMA that allows the electromagnetic information through a telecommunication network (TN) in a non-tangible format. The delivery process will not be affected by traffic conditions in the real world. The delivery time is much faster than the delivery of a tangible deliverable. The process is more resource-efficient as it involves less manpower and other resources. The ECRMA-can be a more functioning-capable device, network, or a computer system. This feature is especially useful in the field of digital document management. One specific example is to provide the delivered contents and stored the contents in various 'fee-per-service' facilities Therefore, this invention discloses a hybrid network for delivering the transmissible content either as delivery of a tangible deliverable or in electromagnetic formats to either ECRMA including but not limited to passive receiver devices or e-mail devices. Therefore, the electromagnetic information received from various senders can be delivered in one single tangible deliverable, achieving the efficiency of delivery materials. Alternately, the information from various senders can be distinguished and separately processed by either embedded mechanism including but not limited to software function in the tangible deliverable, and/or by dedicated software or different electromagnetic formats which the recipient can use. This system of this invention will enable any electromagnetic information, made TN-transferable by individual user(s) or by the service station(s) of the system, to be delivered in multiple routes, devices, and functional processes. People with or without access to TN can send the information to be delivered via TN in multiple manners. The system of this invention therefore provides more choices to deliver the electromagnetic information.

Furthermore, in this hybrid delivery system, the tangible deliverable can be a device. This device is a tangible deliverable, but not simply a storage medium of magnetic/optical medium. It can have the function of displaying and processing the contained electromagnetic information of text, audio, graphic/video data and any other electromagnetic information. It also has the capability to resend the aforementioned information by connecting itself through the telecommunication networks.

For these reasons, the present invention discloses a system and method to provide a great deal of flexibilities for the sender to specify and customize the packaging and forms of the deliverable items and furthermore, the delivery destination may include an e-mail device. The e-mail devices differ from other e-mail services currently in use in the following ways. The 'list of contents' in the 'mail' can be viewed before decision was made to selectively open or download part or whole of the 'mail'. The contents can be further sent to different passive receiver devices even before the 'mail' is opened. In this case further functional processes may be carried out without the need to upload the contents. Of course, additional contents can be added (uploaded) to the previous contents and sent as a new 'package'. This e-mail device can receive 'mail' from users who have no access to TN. One request from the sender allows the TN-transferable electromagnetic information to be sent in different and multiple ways, it can be a tangible, and/or intangible format(s) including the ECRMA. Furthermore, the ECRMA can function in many ways to accomplish the information processing including but not limited to the conversion features of converting video or audio contents to textual output or converting a textual data into audio output thus the ECRMA can further enhance the convenience and process of the contents received by the recipients.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A network communication system comprising:
a network processing station for receiving sender's message contents in different formats from a sender including at least an audio message in an analog format and the network processing station performs an analog to digital conversion for converting the message contents including the audio message into electronic or electro-magnetic digital files for transmitting through a telecommunication network to a receiving server;
the receiving server applies a digital-to-non-digital converting process selected by the sender to convert the digital files including the audio message into a hybrid content deliverable object wherein the hybrid content deliverable object comprises physically deliverable object selected by the sender wherein the user selects among a plurality of physically deliverable objects including an electronic or magnetic data storage device storing the electro-magnetic data/content for carrying out a physical delivery process to deliver the physically deliverable object selected by the sender to a recipient as an initial delivery;
the receiving server further receiving TN-transmissible contents from at least two different senders into data for processing, combining and transmitting the TN-transmissible contents into a content-displaying device for operating and displaying the TN-transmissible contents as a content-displaying device for delivering the content-displaying device to the recipient; and
the recipient further delivers the sender's message contents embodied in the physically deliverable object selected by the sender after the initial delivery to an electronic content receiving and managing apparatus (ECRMA), and sending the processing and/or delivery status report back to the sender.

2. The network communication system of claim 1 wherein: said receiving server further receiving the digital data files transmitted with an electronic mail (e-mail) or other online e-TC and the receiving server in one of the network processing stations performing a digital-to-non-digital conversion converts the digital data files into a hybrid embodiment of recipient's message comprises a selectable deliverable object among many different deliverable objects comprising printed copy and/or the network transmissible content data files for physically delivering and/or transmitting through a network electro-magnetic delivery process to a recipient or the ECRMA.

3. The network communication system of claim 1 wherein: said receiving server further receiving the digital data files transmitted with an electronic mail (e-mail) or other online e-TC and the receiving server in one of the network processing stations performing a digital-to-non-digital conversion converts the digital data files into a hybrid embodiment of recipient's message comprises a selectable deliverable object among many different deliverable objects comprising a compact disk (CD)/DVD, or other magnetic/optical media and/or the network transmissible content data files as designated by the sender for physically delivering and/or transmitting through a network electro-magnetic delivery process to the recipient.

4. The network communication system of claim 1 wherein: said receiving server further receiving the digital data files transmitted with an electronic mail (e-mail) or other online e-TC and the receiving server in one of the network processing stations performing a digital-to-non-digital conversion converts the digital data files into a hybrid embodiment of recipient's message comprises a selectable deliverable object among many different deliverable objects comprising a photographic picture and/or the network transmissible content data files for physically delivering and/or transmitting through a network electro-magnetic delivery process to the recipient.

5. The network communication system of claim 1 wherein: said receiving server further receiving the sender's message contents as download data from a downloadable resource and the receiving server in one of the network processing stations performing a digital-to-non-digital conversion converts the download data into a hybrid embodiment of recipient's message comprises a selectable deliverable object among many different deliverable objects comprising a printed copy and/or the network transmissible content data files for physically delivering and/or transmitting through a network electro-magnetic delivery process to the recipient.

6. The network communication system of claim 1 wherein: said receiving server further receiving the sender's message contents as download data from a downloadable resource and the receiving server in one of the network processing stations performing a digital-to-non-digital conversion converts the download data into a hybrid embodiment of recipient's message comprises a selectable deliverable object among many different deliverable objects comprising a compact disk (CD), or other magnetic/optical media and/or the network transmissible content data files as designated by the sender for physically delivering and/or transmitting through a network electro-magnetic delivery process to the recipient.

7. The network communication system of claim 1 wherein: said receiving server further receiving the sender's message contents as download data from a downloadable resource and the receiving server in one of the network processing stations performing a digital-to-non-digital conversion converts the download data into a hybrid embodiment of recipient's message comprises a selectable deliverable object among many different deliverable objects comprising a photographic picture and/or the network transmissible content data files for physically delivering and/or transmitting through a network electro-magnetic delivery process to the recipient.

8. The network communication system of claim 1 wherein: said network-processing station further includes a sending server for connecting to said network communication system for receiving and performing the digital-to-non-digital conversion for converting the hybrid types of sender's message contents into said electronic or electro-magnetically transmissible digital files.

9. The network communication system of claim 1 further comprising:
a local service station for picking up a physically deliverable local object as an embodiment of the hybrid types of sender's message contents in different formats including the audio message in analog formats from a local sender for carrying out the analog-to-digital conversion for converting the hybrid types of sender's message contents embodied in said physically deliverable local object into said electronic or electro-magnetically transmissible digital files for transmitting to said network processing center.

10. The network communication system of claim 1 further comprising:
a local service station for receiving a physically deliverable local object as an embodiment of hybrid types of sender's message contents in different formats including the audio message in analog formats from a sender with instructions for carrying out the analog-to-digital conversion for converting the hybrid types of sender's message contents embodied in said physically deliverable local object into said electronic or electro-magnetically transmissible digital files for transmitting to said network-processing center.

11. The network communication system of claim 1 further comprising:
a local service station for receiving a telephone message as a part of the hybrid types of sender's message contents with instructions for carrying out the analog-to-digital conversion for converting the hybrid types of sender's message contents including the audio message into said electronic or electro-magnetically transmissible digital files for transmitting to said network processing center.

12. The network communication system of claim 1 wherein:
said network processing station further receives instructions from the sender as the audio message to convert the electronic or electro-magnetic digital files to the user selected formats among the several selectable formats comprising TC formats of textual, audio, photographic or video, or send the already-converted electronic or electro-magnetically transmissible digital files into said physically deliverable object and/or the network transmissible content data files and a user selected process to physically deliver and/or transmit through a network electro-magnetic delivery process to the designated recipient(s) or the ECRMA.

13. The network communication system of claim 1 wherein:
the sender providing instruction as the audio message to said network processing station to deliver said hybrid content deliverable object as a hybrid embodiment of recipient's message comprises a selectable deliverable object among many different deliverable objects comprising printed copy and/or the network transmissible content data files to many recipients.

14. The network communication system of claim 1 further comprising:
a network processing mobile station disposed on a vehicle for driving to the sender or to the recipient.

15. The network communication system of claim 1 wherein:
said network processing station further automatically accept, receive and performing the digital-to-non-digital conversion convert the electronic or electro-magnetically transmissible data/content according to sender's instructions for physically delivering and/or transmitting through the telecommunication network for delivering to the recipient or the ECRMA.

16. The network communication system of claim 1 further comprising:
a data security system for protecting data transmitted through the telecommunication network.

17. A method for delivering a physically deliverable object and/or network transmissible content data files to a designated recipient comprising:
receiving and analog-to-digital converting sender's message contents including at least an audio message in analog formats into an electronic or electro-magnetically transmittable digital files for transmitting through a telecommunication network to a networked processing station and performing a digital-to-non-digital conversion for converting said electronic or electro-magnetically transmittable digital files into a hybrid embodiment of recipient's message comprises a selected deliverable object selectable among many different deliverable objects comprising said physically deliverable object wherein the physically deliverable object including an electronic or magnetic data storage device storing the electro-magnetic data/content for delivering to and/or transmitting through a network electro-magnetic delivery process to the designated recipient as an initial delivery;
receiving TN-transmissible contents from at least two different senders into the a networked processing center for processing, combining and transmitting the TN-transmissible contents into a content-displaying device for operating and displaying the TN-transmissible contents as a content-displaying device for delivering the content-displaying device to the designated recipient; and
the designated recipient further delivers the sender's message contents embodied in the physically deliverable object selected by the sender after the initial delivery to an electronic content receiving and managing apparatus (ECRMA), and the ECRMA sending the processing and/or delivery status report back to the sender.

18. The method of claim 17 wherein:
said step of transmitting and converting said electronic or electro-magnetically transmittable digital files further comprising a step of transmitting the digital files with an electronic mail (e-mail) or other online e-TC and performing the digital-to-non-digital conversion for converting said digital files into the selected deliverable object embodied in a compact disk (CD) or other magnetic/optical media among many different deliverable objects comprising printed copy and/or the network transmissible content data files for physically delivering and/or transmitting through a network electro-magnetic delivery process to a recipient or the ECRMA.

19. The method of claim 17 wherein:
said step of transmitting and converting said electronic or electro-magnetically transmittable digital files further comprising a step of transmitting the digital files with an electronic mail (e-mail) or other online e-TC and performing the digital-to-non-digital conversion for converting said digital files into the selected deliverable object embodied in a photographic picture among many different deliverable objects comprising printed copy and/or the network transmissible content data files for delivering to said remote recipient or the ECRMA.

20. The method of claim 17 wherein:
said step of transmitting and converting said electronic or electro-magnetically transmittable digital files further comprising a step of downloading the digital files from downloadable resources and performing the digital-to-non-digital conversion for converting said digital files into the selected deliverable object embodied in a printed copy among many different deliverable objects comprising printed copy and/or the network transmissible content data files for delivering to said remote recipient or the ECRMA.

21. The method of claim 17 wherein:
said step of transmitting and converting said electronic or electro-magnetically transmittable digital files further comprising a step of downloading the digital files from downloadable resources and performing the digital-to-non-digital conversion for converting said digital files into the selected deliverable object embodied in a compact disk (CD) among many different deliverable objects comprising printed copy and/or the network transmissible content data files for delivering to said remote recipient or the ECRMA.

22. The method of claim 17 wherein:
said step of transmitting and converting said electronic or electro-magnetically transmittable digital files further comprising a step of downloading the digital files from downloadable resources and performing the digital-to-non-digital conversion for converting said digital files -into the selected deliverable object embodied in a photographic picture among many different deliverable objects comprising printed copy and/or the network transmissible content data files for delivering to said remote recipient or the ECRMA.

23. The method of claim 17 wherein:
the step of receiving the hybrid types of sender's message contents including a step of receiving the sender's audio messages into a local service station from a local sender in the analog formats for carrying out the analog-to-digital conversion for converting the hybrid types of sender's message contents into said electronic or electro-magnetically transmittable digital files for transmitting to said network-processing station.

24. The method of claim 17 further comprising:
said network processing center receiving and executing instructions from a sender for performing the digital-to-non-digital conversion for converting said electronic or electro-magnetically transmittable digital files into said the selectable deliverable object among many different deliverable objects comprising the printed copy and/or the network transmissible content data files for physically delivering to and/or transmitting through a network electro-magnetic delivery process to the designated recipient(s) or the ECRMA.

25. The method of claim 17 further comprising:
the sender sending mass mails providing instruction in the sender's audio messages to said network processing center to deliver said hybrid content deliverable object as the hybrid embodiment of recipient's message comprises the selectable deliverable object among many different deliverable objects comprising and/or the network transmissible content data files to the ECRMA then to many recipients for promoting messages represented by said electronic or electro-magnetic data/contents transmissible through telecommunication network.

26. The method of claim 17 wherein:
said step of transmitting and converting said electronic or electro-magnetically transmittable digital files further comprising a step of transmitting data/content of commercial or technical journals/magazines, newspapers, e-books, or other electronic publications as the hybrid embodiment of recipient's message selected by the sender among many different deliverable objects for delivering to the recipient.

27. The method of claim 17 wherein:
said step of transmitting and converting said electronic or electro-magnetically transmittable digital files further comprising a step of transmitting and converting television contents/movies/video contents as the hybrid embodiment of recipient's message selected by the sender among the selectable deliverable objects for delivering to the recipient.

28. The method of claim 17 wherein:
said step of transmitting and converting said electronic or electro-magnetically transmittable digital files further comprising a step of transmitting and converting the digital files of a software, electronic audio/video game, audio CDs/DVDs, photographs or audio/video contents as the hybrid embodiment of recipient's message selected by the sender among the selectable deliverable objects for delivering to the recipient.

29. The method of claim 17 wherein:
said step of transmitting and converting said electronic or electro-magnetically transmittable digital files further comprising a step of transmitting the digital files from the ECRMA.

30. The method of claim 17 wherein:
said step of transmitting and converting said electronic or electro-magnetically transmittable digital files further comprising a step of transmitting and protecting the digital files by applying a data security system.

31. A method for sending and processing electronic or electromagnetic/optical data/contents comprising:
receiving sender's message contents including at least an audio message in analog formats and carrying out an analog to digital conversion to convert the sender message contents including the audio message into an electronic or electro-magnetically transmittable digital files for sending the digital files on a network followed by performing a digital-to-non-digital conversion for converting the digital files into a sender selected deliverable embodiment wherein the digital files are embodied in a tangible deliverable object selectable by a sender among many hybrid deliverable embodiments comprising a printed copy, an electronic or magnetic data storage device storing the electronic or electromagnetic/optical data/contents and/or network transmissible content data files to a designated recipients as an initial delivery;
receiving TN-transmissible contents from at least two different senders into a data processing server for processing, combining and transmitting the TN-transmissible contents into a content-displaying device for operating and displaying the TN-transmissible contents as a content-displaying device for delivering the content-displaying device to the designated recipient; and
one of the designated recipients further delivers the sender's message contents embodied in the physically deliverable object selected by the sender to an electronic content receiving and managing apparatus (ECRMA) after the initial delivery, and the ECRMA sending the processing and/or delivery status report back to the sender.

32. The method of claim 31 further comprising:
said step of sending the electronic or electromagnetic/optical data/contents to the designated recipients as the selected deliverable embodiment further comprising a step of allowing a sender to choose a digital-to-non-digital conversion method, delivery formats, delivery routes and a delivery time frame.

33. The method of claim 31 wherein:
said step of sending and digital-to-non-digital converting the electronic or electromagnetic/optical data/contents further comprising steps of archiving, organizing, indexing, content searching, modifying, categorizing and storing the electronic or electromagnetic/optical data/contents.

34. The method of claim 31 further comprising:
processing the electronic or electromagnetic/optical data/contents by displaying the electronic or electromagnetic/optical data/contents on a display device.

35. The method of claim 31 further comprising:
processing the electronic or electromagnetic/optical data/contents by printing at least a part of the electronic or electromagnetic/optical data/contents.

36. The method of claim 31 further comprising:
sending the electronic or electromagnetic/optical data/contents to an original sender.

37. The method of claim 31 further comprising:
processing and sending the electronic or electromagnetic/optical data/contents in the ECRMA.

38. A system for delivering a physically deliverable object and/or network transmissible content data files to a designated recipient comprising:
a user account system to allow users to transmit sender's message contents including at least an audio message in analog formats for carrying out an analog-to-digital conversion to convert the sender's message content into an electronic or electro-magnetically transmittable content file followed by transmitting the electronic or electro-magnetically transmittable content file through a network to a network processing center for converting said electronic or electro-magnetically transmittable content file into a selected deliverable embodiment selectable by the sender among hybrids embodiments comprising said physically deliverable object including an electronic or magnetic data storage device storing the electronic or electro-magnetic transmittable content and/or the network transmissible content data files for delivering to said designated recipient as an initial delivery;
the user account system further receiving TN-transmissible contents from at least two different senders into a data processing server for processing, combining and transmitting the TN-transmissible contents into a content-displaying device for operating and displaying the TN-transmissible contents as a content-displaying device for delivering the content-displaying device to the designated recipient; and the recipient further delivers the sender's message contents embodied in the physically deliverable object selected by the sender to an electronic content receiving and managing apparatus (ECRMA) after the initial delivery, and the ECRMA sending the processing and/or delivery status report back to the sender.

39. The system of claim 38 wherein:
said user account system comprises registered user account(s) with a corresponding physical address for receiving said sender selected deliverable embodiment.

40. The system of claim 38 wherein:
said user account system further updates changes of a physical address to deliver the selected deliverable embodiment.

41. The system of claim 38 wherein:
said user account system further chooses a level of privacy protection for selectively disclosing account information.

42. The method of claim 38 wherein:
the step of receiving and processing the TN-transmissible contents further includes a step of receiving and converting the TN-transmissible contents in different electronic file formats received from the different senders before combining and transmitting the TN-transmittable contents into the content-displaying device.

43. The method of claim 38 wherein:
the step of receiving and processing the TN-transmissible contents further includes a step of receiving and organizing the TN-transmissible contents.

44. The method of claim 38 wherein:
the step of receiving and processing the TN-transmissible contents further includes a step of receiving and converting the TN-transmissible contents to file format(s) compatible to an ECRMA.

* * * * *